United States Patent
Min et al.

(10) Patent No.: US 8,116,246 B2
(45) Date of Patent: Feb. 14, 2012

(54) SYSTEM AND METHOD FOR DATA TRANSMISSION/RECEPTION BASED ON AN OPERATIONAL STATE OF A MOBILE STATION IN A COMMUNICATION SYSTEM

(75) Inventors: Chan-Ho Min, Yongin-si (KR); Jong-Hyung Kwun, Seongnam-si (KR); Ju-Yeop Kim, Anyang-si (KR); Dong-Ho Cho, Seoul (KR); Chul-Kee Hong, Hwaseong-si (KR); Hyu-Dae Kim, Daejeon (KR); Hun-Joo Lee, Daegu (KR); Sik Choi, Daejeon (KR); Ho-Won Lee, Chungju-si (KR); Woong-Sup Lee, Daejeon (KR); Se-Young Yun, Jecheon-si (KR)

(73) Assignees: Samsung Electronics Co., Ltd., Suwon-si (KR); Korea Advanced Institute of Science and Technology, Deajeon Metropolitan (KR)

( * ) Notice: Subject to any disclaimer, the term of this patent is extended or adjusted under 35 U.S.C. 154(b) by 902 days.

(21) Appl. No.: 12/055,146

(22) Filed: Mar. 25, 2008

(65) Prior Publication Data
US 2008/0240009 A1   Oct. 2, 2008

(30) Foreign Application Priority Data
Mar. 26, 2007   (KR) .................. 10-2007-0029441

(51) Int. Cl.
*H04B 7/00* (2006.01)
*G08C 17/00* (2006.01)

(52) U.S. Cl. ............... 370/311; 455/343.5; 455/522
(58) Field of Classification Search .............. None
See application file for complete search history.

(56) References Cited

U.S. PATENT DOCUMENTS

| | | | |
|---|---|---|---|
| 2005/0068916 A1* | 3/2005 | Jacobsen et al. | 370/328 |
| 2005/0143119 A1* | 6/2005 | Chandra et al. | 455/522 |
| 2007/0049354 A1* | 3/2007 | Jin et al. | 455/574 |
| 2007/0091836 A1* | 4/2007 | Oprescu-Surcobe et al. | 370/318 |
| 2007/0213101 A1* | 9/2007 | Oh et al. | 455/572 |
| 2007/0265025 A1* | 11/2007 | Commarford et al. | 455/517 |
| 2008/0107056 A1* | 5/2008 | Choi et al. | 370/311 |
| 2008/0175181 A1* | 7/2008 | Kakumaru et al. | 370/311 |

FOREIGN PATENT DOCUMENTS

KR   10-0701742 B1   3/2007

* cited by examiner

*Primary Examiner* — Robert Scheibel
(74) *Attorney, Agent, or Firm* — Jefferson IP Law, LLP (57) ABSTRACT

Disclosed is a system and method for transmitting data based on an operational state of a mobile station in a communication system. The method includes, when detecting a low battery state of the mobile station, storing one or more data packets to be transmitted to the mobile station, extracting at least one data packet, which has a transmission delay time larger than a difference between a maximum delay time and preset margin, from the one or more stored data packets, and transmitting at least a part of the extracted at least one data packet to the mobile station by using a resource allocated to the mobile station.

18 Claims, 6 Drawing Sheets

SYSTEM AND METHOD FOR DATA TRANSMISSION/RECEPTION BASED ON AN OPERATIONAL STATE OF A MOBILE STATION IN A COMMUNICATION SYSTEM

PRIORITY

This application claims the benefit under 35 U.S.C. §119 (a) of a Korean patent application filed in the Korean Industrial Property Office on Mar. 26, 2007 and assigned Serial No. 2007-29441, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., Ltd. and the Korea Advanced Institute of Science and Technology.

BACKGROUND OF THE INVENTION

1. Field of the Invention

The present invention relates to a system and method for data transmission/reception in a communication system. More particularly, the present invention relates to a system and method for data transmission/reception according to an operational state of a Mobile Station (MS) in a communication system.

2. Description of the Related Art

Next generation communication systems are being developed with an emphasis on providing services that can achieve high-speed large-capacity data transmission/reception for Mobile Stations (MSs). Representative examples of such next communication systems include a communication system using Institute of Electrical and Electronic Engineers (IEEE) 802.16 standards, and a communication system using 3rd Generation Partnership Project Long Term Evolution (3GPP LTE) standards. Both the IEEE 802.16 communication system and the 3GPP LTE communication system consider the mobility of an MS. Power consumption of the MS serves as an important factor of the entire system. Therefore, the IEEE 802.16 communication system supports a sleep mode operation between an MS and a Base Station (BS) in order to minimize power consumption of the MS, and the 3GPP LTE communication system supports a Radio Resource Control (RRC) state operation in order to minimize power consumption of the MS.

Figure 1:
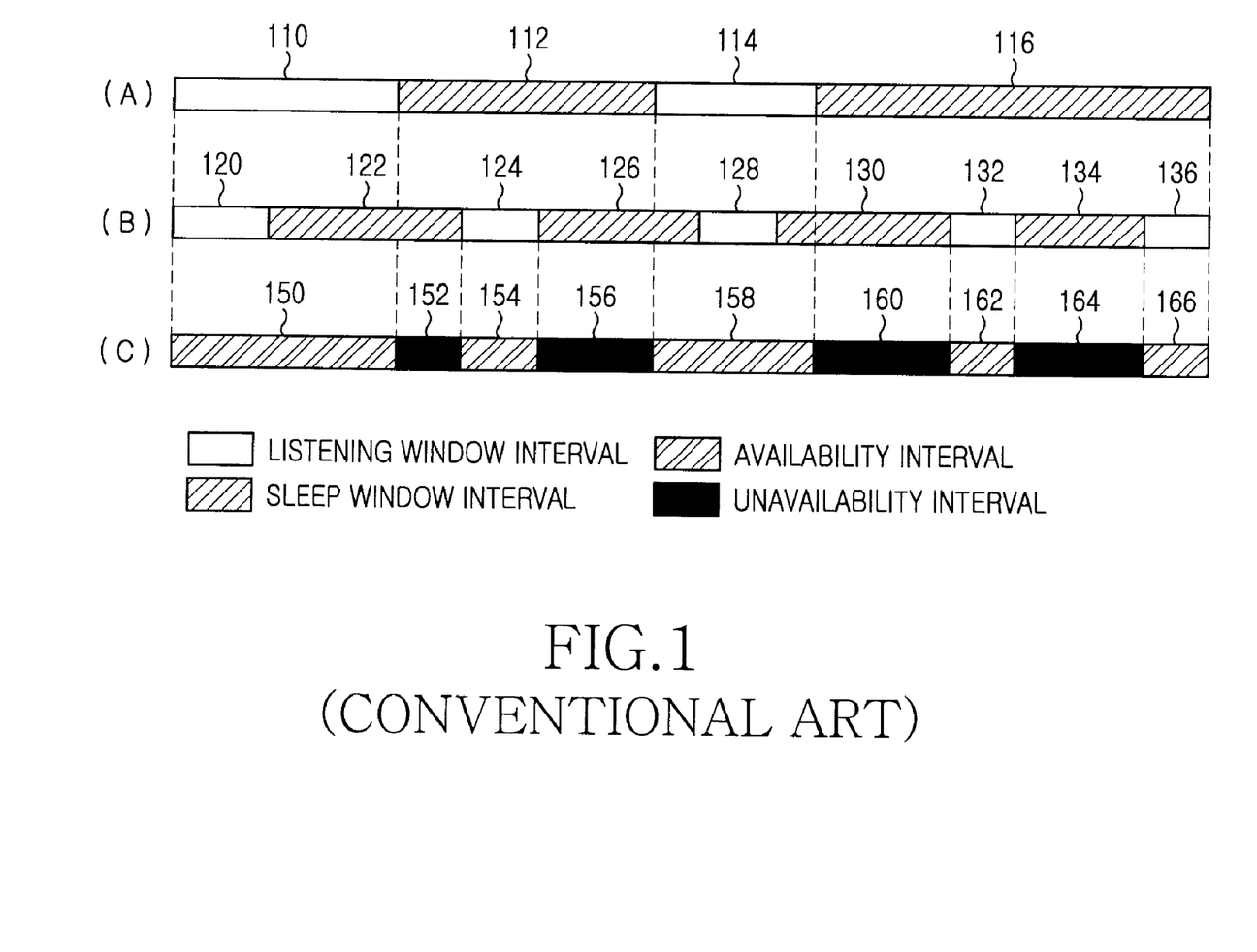
FIG. 1 illustrates sleep mode operations of a conventional IEEE 802.16 communication system.

FIG. 1 illustrates sleep mode operations of a conventional IEEE 802.16 communication system.

The sleep mode operation illustrated in FIG. 1 corresponds to a sleep mode operation in the case of simultaneously using both a first service and a second service. As illustrated in FIG. 1, (A) corresponds to a sleep mode operation for providing the first service, (B) corresponds to a sleep mode operation for providing the second service, and (C) corresponds to the sleep mode operation of the MS corresponding to the sleep mode operations of the first service and the second service. As used herein, for the convenience of description, each of the frame intervals for providing the first service is called a "first service interval," each of the frame intervals for providing the second service is called a "second service interval," and each of the frame intervals in which the MS operates in the sleep mode is called an "MS sleep mode operation interval."

The first service interval includes listening window intervals 110 and 114 and sleep window intervals 112 and 116, and the second service interval includes listening window intervals 120, 124, 128, 132, and 136 and sleep window intervals 122, 126, 130, and 134. As used herein, the listening window interval refers to an interval in which an MS operating in the sleep mode temporarily transits to an awake mode and monitors if a data packet to be transmitted/received through a wireless channel exists, and the sleep window interval refers to an interval for monitoring the wireless channel.

The MS sleep mode operation interval includes availability intervals 150, 154, 158, 162, and 166 and unavailability intervals 152, 156, 160, and 164. As used herein, each of the availability intervals refers to an interval that does not belong to any sleep window intervals related to the first service and the second service, and each of the unavailability intervals refers to an interval that belongs to sleep window intervals related to both the first service and the second service. The unavailability interval corresponds to a sleep interval of the MS, in which the MS stops supplying power to a transmission/reception module thereof and operates in a low power state.

Figure 2:
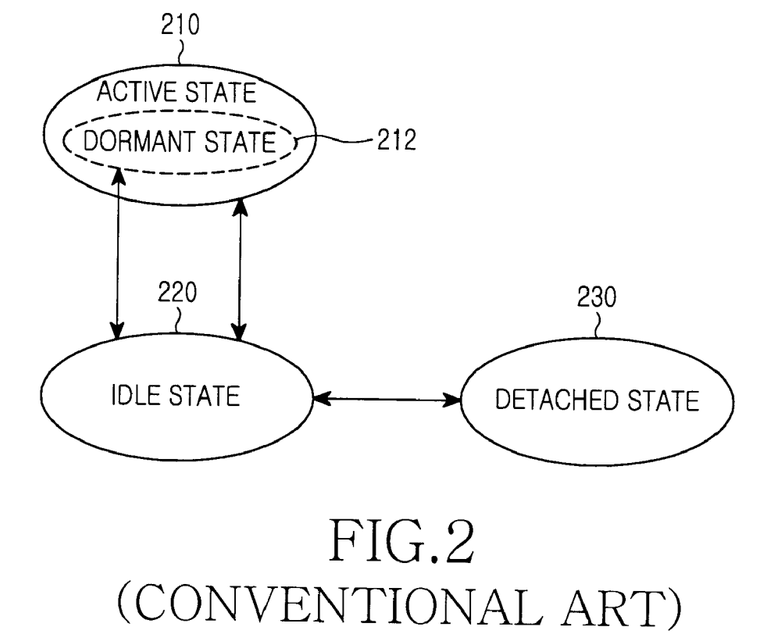
FIG. 2 illustrates a RRC state operation of a conventional 3GPP LTE communication system.

FIG. 2 illustrates a RRC state operation of a conventional 3GPP LTE communication system.

Referring to FIG. 2, the RRC state includes an active state 210, a dormant state 212, an idle state 220, and a detached state 230.

The active state 210 refers to a state in which the MS is connected to the BS and transmits/receives data packets to/from the BS. The active state 210 includes the dormant state 212.

The dormant state 212 refers to a state in which the MS is connected to the BS but does not transmit or receive a data packet. An interval to which the dormant state 212 is applied corresponds to an unavailability interval in which data packets are not transmitted or received. Therefore, an MS in the dormant state 212 stops supplying power to a transmission/reception module thereof, thereby minimizing the power consumption.

The idle state 220 refers to a state in which an MS has been registered in the BS but is not connected to the BS yet. An MS in the idle state 220 can receive a paging message or other broadcasting information. Further, the MS in the idle state 220 scans reference signals transmitted from neighbor BSs, such as a Carrier to Interference and Noise Ratio (CINR) that can be used for measurement of a quality of a pilot channel signal, in preparation for handover.

The detached state 230 refers to a state in which communication between an MS and a BS has been interrupted, for example, a state in which the MS has been powered off or a state in which the MS is unable to receive a signal transmitted from the BS.

As noted from the above description referring to FIGS. 1 and 2, both the IEEE 802.16 communication system and the 3GPP LTE communication system support an operation of minimizing the power consumption of an MS. However, the interval in which the MS operates in the sleep mode, that is, an interval in which the MS does not transmit or receive a data packet, can be reduced according to a scheduling operation of the IEEE 802.16 communication system and the 3GPP LTE communication system. When the interval in which the MS does not transmit or receive a data packet is reduced, the interval in which the MS operates in the sleep mode is also reduced, so that it is possible to minimize the power consumption.

Meanwhile, when a battery of an MS has been exhausted, the MS is unable to perform communication. In an MS having insufficient battery power, minimization of power consumption is very important, even at the expense of transmission rate reduction, data transmission delay, etc. However, it is difficult to achieve minimization of battery power consumption, only by the operation for reducing the power consumption of an MS supported by the current IEEE 802.16 communication system and 3GPP LTE communication system.

SUMMARY OF THE INVENTION

An aspect of the present invention is to address at least the above-mentioned problems and/or disadvantages and to provide at least the advantages described below. Accordingly, an aspect of the present invention is to provide a system for data transmission/reception according to an operational state of an MS in a communication system and a method for supporting the same.

Also, another aspect of the present invention is to provide a system and a method for controlling an operational state of an MS in order to minimize power consumption of the MS in a communication system.

In accordance with an aspect of the present invention, a method for transmitting data based on an operational state of a mobile station by a base station in a communication system is provided. The method includes when detecting a low battery state of the mobile station, storing one or more data packets to be transmitted to the mobile station, extracting at least one data packet, which has a transmission delay time larger than a difference between a maximum delay time and preset margin, from the one or more stored data packets, and transmitting at least a part of the extracted at least one data packet to the mobile station by using a resource allocated to the mobile station.

In accordance with another aspect of the present invention, a method for transmitting data based on an operational state of a mobile station in a communication system is provided. The method includes transiting to a low battery state from at least one of a dormant state in which the mobile station is connected to a base station but does not transmit or receive a data packet and an idle state in which the mobile station has been registered in the base station but is not yet connected to the base station, when a remaining battery capacity of the mobile station is less than or equal to a preset battery capacity, and transmitting one or more data packets with a transmission power capable of guaranteeing a service quality of a corresponding connection based on a data packet transmission rate and a data packet delay time of the mobile station in the low battery state.

In accordance with another aspect of the present invention, a system for transmitting data based on an operational state of a mobile station in a communication system is provided. The system includes a base station for, when detecting a low battery state of the mobile station, storing one or more data packets to be transmitted to the mobile station, extracting at least one data packet, which has a transmission delay time longer than a difference between a maximum delay time and preset margin, from the one or more stored data packets, and transmitting at least a part of the extracted at least one data packet to the mobile station by using a resource allocated to the mobile station.

In accordance with another aspect of the present invention, a system for transmitting data based on an operation state of a mobile station in a communication system is provided. The system includes a mobile station for transiting to a low battery state from at least one of a dormant state in which the mobile station is connected to a base station but does not transmit or receive a data packet and an idle state in which the mobile station has been registered in the base station but is not yet connected to the base station, when a remaining battery capacity of the mobile station is less than or equal to a preset battery capacity, and for transmitting one or more data packets with a transmission power capable of guaranteeing a service quality of a corresponding connection based on a data packet transmission rate and a data packet delay time of the mobile station in the low battery state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention include a data transmission/reception system and method for operational state control in order to minimize power consumption of a Mobile Station (MS) in a communication system. In particular, the following description of the system and method for operational state control according to exemplary embodiments of the present invention is based on a communication system (3GPP LTE communication system) using 3GPP LTE standards, as an example. However, exemplary embodiments of the present invention can equally be applied to other communication systems, as well as the 3GPP LTE communication system.

Figure 3:
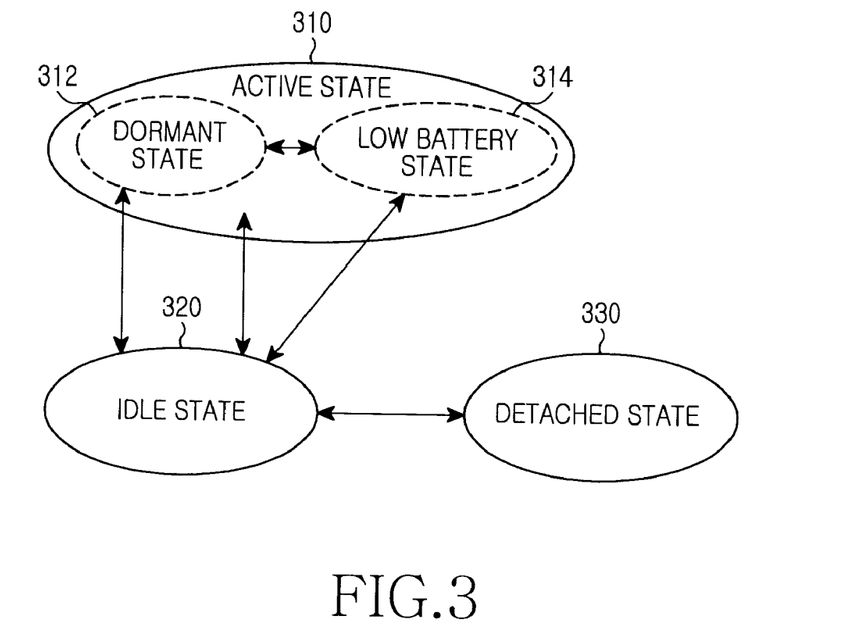
FIG. 3 illustrates an RRC state operation of a 3GPP LTE communication system according to an exemplary embodiment of the present invention.

FIG. 3 illustrates an RRC state operation of a 3GPP LTE communication system according to an exemplary embodiment of the present invention.

Referring to FIG. 3, the RRC state operation includes an active state 310, an idle state 320, and a detached state 330. The active state 310 includes a dormant state 312 and a low battery state 314.

The active state 310 refers to a state in which an MS is connected to a BS, transmits/receives a data packet from/to the BS, and can transit to the idle state 320.

The dormant state 312 refers to a state in which the MS is connected to the BS but does not transmit or receive a data packet, and can transit to the idle state 320. An interval to which the dormant state 312 is applied corresponds to an unavailability interval in which data packets are not transmitted or received. Therefore, an MS in the dormant state 312 stops supplying power to a transmission/reception module thereof, thereby minimizing the power consumption.

The low battery state 314 refers to a state in which an MS having only a little amount of battery power minimizes its power consumption, in consideration of system performance degradation, such as transmission rate reduction and data delay increase, in order to extend possible communication time of the MS. In the low battery state 314, the MS can transit to the idle state 320. Also, in the low battery state 314, a downlink scheduling and uplink power control scheme newly proposed by exemplary embodiments of the present invention is used for minimization of power consumption.

The idle state 320 refers to a state in which an MS has been registered in the BS but is not yet connected to the BS. In the idle state 320, the MS can transit to the active state 310, the dormant state 312, the low battery state 314, or the detached state 330. An MS in the idle state 320 can receive a paging message or other broadcasting information, and scans reference signals transmitted from neighbor BSs, such as a Carrier to Interference and Noise Ratio (CINR) that can be used for the measurement of a quality of a pilot channel signal, in preparation for a handover.

The detached state 330 refers to a state in which a communication between an MS and a BS has been interrupted, for example, a state in which the MS has been powered off or a state in which the MS is unable to receive a signal transmitted from the BS. In the detached state 330, the MS can transit to the idle state 320. A transition of an MS having insufficient remaining battery capacity from the dormant state or the idle state to the low battery state for the minimization of power consumption will be described with reference to FIG. 4.

Figure 4:
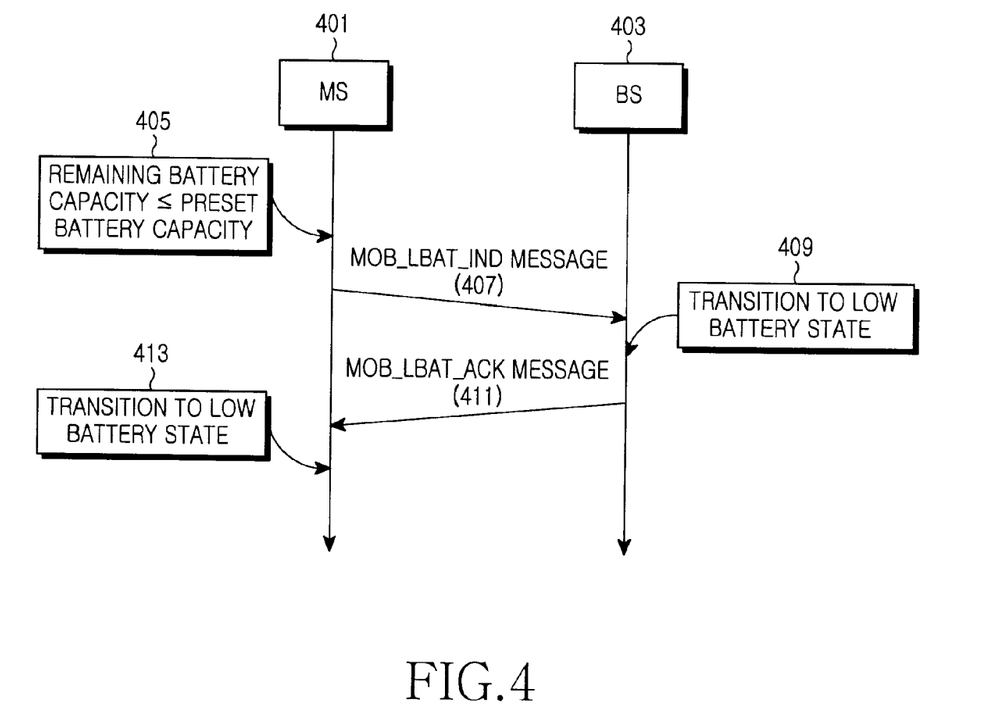
FIG. 4 is a signal flow diagram illustrating a process of transition of an MS to a low battery state in a 3GPP LTE communication system according to an exemplary embodiment of the present invention.

FIG. 4 is a signal flow diagram illustrating a process of transition of an MS to the low battery state in a 3GPP LTE communication system according to an exemplary embodiment of the present invention.

Figure 5:
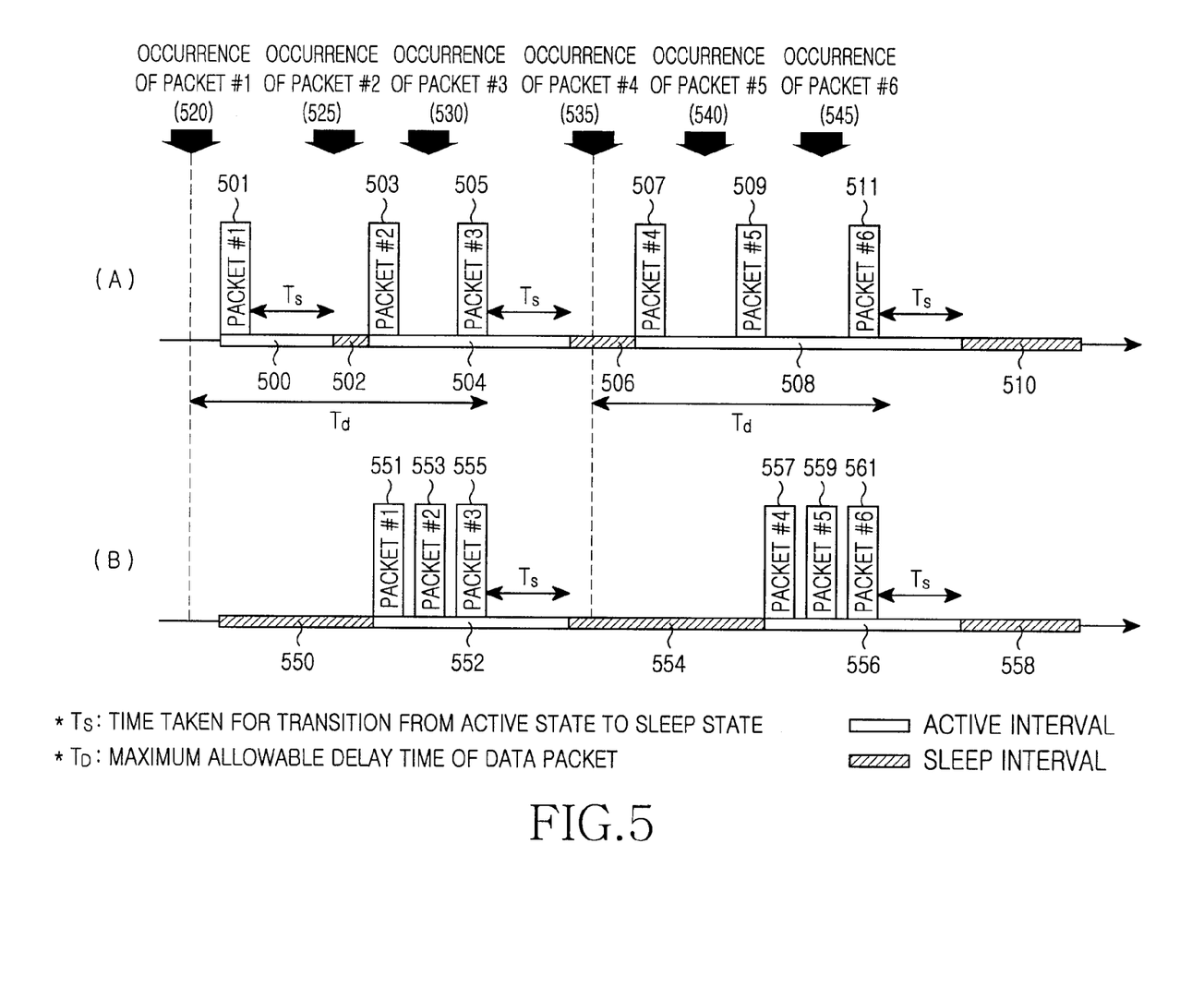
FIG. 5 illustrates a comparison between a process of transmitting data packets according to a conventional downlink scheduling scheme by a BS and a process of transmitting data packets according to a downlink scheduling scheme by a BS according to an exemplary embodiment of the present invention, when an MS has transitioned to a low battery state.

Referring to FIG. 4, an MS 401 in the dormant state or idle state compares a remaining battery capacity with a preset battery capacity. Thereafter, when the remaining battery capacity becomes less than or equal to a preset battery capacity (step 405), the MS 401 transmits a low battery indication message to the BS 403, i.e. a Mobile Lack of Battery Indication (MOB_LBAT_IND) message (step 407). Upon receiving the MOB_LBAT_IND message, the BS 403 transits to the low battery state (step 409) and transmits a low battery acknowledgement message, i.e. a Mobile Lack of Battery Acknowledgement (MOB_LBAT_ACK) message, which is a response to the MOB_LBAT_IND message, to the MS 401 (step 411). Upon receiving the MOB_LBAT_ACK message, the MS 401 transits to the low battery state (step 413). Referring to FIG. 5, a description will be given regarding a process in which a BS transmits a data packet to an MS by using a downlink scheduling scheme proposed by an exemplary embodiment of the present invention when the MS transits to the low battery state. FIG. 5 illustrates a comparison between a process of transmitting data packets according to a conventional downlink scheduling scheme by a BS and a process of transmitting data packets according to a downlink scheduling scheme by a BS according to an exemplary embodiment of the present invention, when the MS has transitioned to the low battery state.

As illustrated in FIG. 5, (A) corresponds to a process of transmitting data packets according to a conventional downlink scheduling scheme by a BS, and (B) corresponds to a process of transmitting data packets according to a new downlink scheduling scheme by a BS according to an exemplary embodiment of the present invention.

According to the process shown in (A) based on a conventional downlink scheduling scheme, the BS transmits data packets to the MS in a sequence in which the data packets have occurred. According to the process shown in (B) based on a downlink scheduling scheme proposed by an exemplary embodiment of the present invention, the BS first stores data packets and then simultaneously transmits the data packets. When the BS first stores data packets and then simultaneously transmits the data packets as in the process shown in (B), it is possible to maximize the length of the sleep interval, thereby reducing the power consumption.

In FIG. 5, the active intervals 500, 504, 508, 552, and 556 correspond to intervals in each of which the BS can transmit data packets to the MS, and the sleep intervals 502, 506, 510, 550, 554, and 558 correspond to intervals in each of which the MS reduces power consumption by minimizing power supplied to a transmission/reception module thereof. Further, packet #1 501, packet #2 503, packet #3 505, packet #4 507, packet #5 509, and packet #6 511 correspond to data packets transmitted according to the conventional downlink scheduling scheme. Also, packet #1 551, packet #2 553, packet #3 555, packet #4 557, packet #5 559, and packet #6 561 correspond to data packets transmitted according to the new downlink scheduling scheme proposed by an exemplary embodiment of the present invention.

First, referring to (A), when packet #1 occurs (step 520), the BS enters the active interval 500 by transiting to the active state, and then transmits packet #1 501 to the MS. If a next data packet does not occur during passage of $T_s$ after packet #1 501 is transmitted, the BS transits to the sleep state and enters the sleep interval 502. As used herein, $T_s$ refers to the time taken for the transition of the MS from the active state to the sleep state.

Thereafter, if packet #2 occurs in the sleep interval 502 (step 525), the BS transits to the active state, enters the active interval 504, and then transmits packet #2 503. After transmitting packet #2 503, if packet #3 occurs before $T_s$ (step 530), the BS stays in the current active state. Then, if a next data packet does not occur during passage of $T_s$ after the occurrence of packet #3 (step 530), the BS transits to the sleep state and enters the sleep interval 506.

If packet #4 occurs (step 535), the BS transitions from the sleep state to the active state, enters the active interval 508, and then transmits packet #4 507 to the MS. Then, after transmitting packet #4 507, if packet #5 occurs before $T_s$ (step 540), the BS stays in the current active state and transmits packet #5 509 to the MS. Then, after transmitting packet #5 509, if packet #6 511 occurs before $T_s$ (step 545), the BS stays in the current active state and transmits packet #6 511 to the MS. After passage of $T_s$ after transmitting packet #6 511, the BS transits to the sleep state and enters the sleep interval 510.

Meanwhile, in the process described above, when the MS has received a data packet, the MS must transmit the data packet to the MS within $T_d$. As used herein, $T_d$ refers to the maximum time during which the BS can buffer a data packet in a queue before transmitting the data packet to the MS, that is, the maximum allowable delay time of the data packet.

However, when the BS transmits the data packets in a sequence of data packet occurrence regardless of the sleep interval of the MS as shown in (A), the interval between transmitted data packets becomes shorter than $T_s$. As a result, the sleep interval of the MS also becomes shorter, and it is thus impossible to minimize power consumption.

Next, according to the process shown in (B), the BS buffers the data packets that occurred in steps 520 to 530, which includes packet #1 551, packet #2 553, and packet #3 555, in a queue of the BS. Then, if preset conditions are satisfied, the BS transits to the active state, enters the active interval 552, and transmits the data packets to the MS. Then, after passage of $T_s$ after the transmission of packet #1 551, packet #2 553, and packet #3 555, the BS transits to the sleep state and enters the sleep interval 554.

Thereafter, the BS buffers the data packets that occurred in steps 535 to 545, which includes packet #4 557, packet #5 559, and packet #6 561, in a queue of the BS. Then, if preset conditions are satisfied, the BS transits to the active state, enters the active interval 556, and transmits the data packets to the MS. Then, after passage of $T_s$ after the transmission of packet #4 557, packet #5 559, and packet #6 561, the BS transits to the sleep state and enters the sleep interval 558.

When the BS transmits data packets according to the new downlink scheduling scheme proposed by an exemplary embodiment of the present invention as shown in (B), the MS can obtain wider sleep intervals, which can reduce power consumption, in comparison with the process shown in (A).

Hereinafter, a more detailed description will given on a downlink scheduling scheme, according to which a BS, upon detecting a low battery state of an MS, operates according to the process illustrated in (B), so as to reduce power consumption of the MS. In order to transmit a data packet according to the downlink scheduling scheme at the $i^{th}$ frame, a condition defined by formula (1) below should be satisfied.

$$t_j > T_d - \alpha, \text{ if } j \in \{1, 2, \ldots, N(i)\} \quad (1)$$

In formula (1), $t_j$ denotes time (hereinafter, referred to as "transmission delay time") delayed before the $j^{th}$ data packet is transmitted to the MS, $T_d$ denotes maximum time (hereinafter, referred to as "maximum delay time") allowed for time delay of a data packet, $\alpha$ denotes a preset margin to be applied to $T_d$, j denotes an index of a data packet buffered in a queue of the BS before the data packet is transmitted to the MS, and N(i) denotes the number of data packets buffered in the queue of the BS at the $i^{th}$ frame.

In a case where the $j^{th}$ data packet has been buffered in the queue of the BS at the $i^{th}$ frame, the BS can transmit the data packet to the MS only when $t_j$ exceeds a difference between $T_d$ and $\alpha$.

Meanwhile, when the BS transmits a data packet to the MS in accordance with the condition defined by formula (1), the BS transmits a maximum number of data packets by using resources allocated to a corresponding connection as much as possible. The maximum number of data packets transmissible by using the allocated resources can be defined by formula (2) below.

$$(j_1, j_2, \ldots j_m, m) = \underset{j_k \in \{1, 2, \ldots N(i)\}, m < N(i)}{\operatorname{argmax}} \sum_{k=1}^{m} t_{j_k} \quad (2)$$

$$\text{s.t.} \sum_{k=1}^{m} f_{j_k} \leq R_{max}(i)$$

In formula (2), $j_1, j_2, \ldots, j_m$ denote indexes of transmissible data packets, m denotes the maximum number of transmissible data packets, N(i) denotes the number of data packets buffered in a queue of the BS at the $i^{th}$ frame, $t_{j_k}$ denotes time delayed until the $j_k^{th}$ packet is transmitted to the MS, $f_{j_k}$ denotes a minimum quantity of resources necessary for transmission of the $j_k^{th}$ packet of a corresponding connection, and $R_{max}(i)$ denotes a maximum quantity of resources assignable to a corresponding MS at the $i^{th}$ frame.

The data packets buffered in the queue of the BS are transmitted in a sequence in which a packet stored longer than the other packets in the queue is transmitted before the other packets. Further, the BS transmits a maximum number of transmissible data packets in accordance with $R_{max}(i)$ of the MS. In other words, the BS sequentially transmits the data packets in a sequence in which the BS first transmits a packet stored longest and then transmits a packet stored next longest, and the BS transmits a maximum number of transmissible data packets in accordance with $R_{max}(i)$.

Next, a process in which a BS having detected a low battery state of an MS transmits data packets to the MS based on a scheduling scheme according to an exemplary embodiment of the present invention will be described with reference to FIG. 6.

Figure 6:
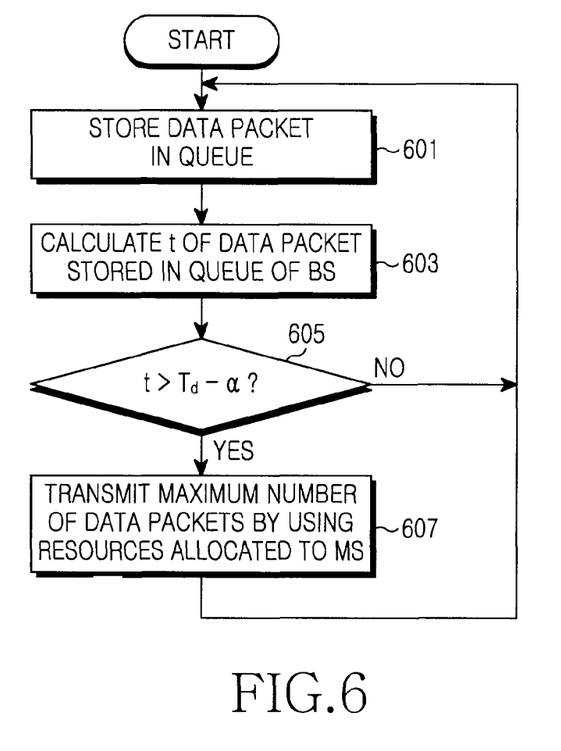
FIG. 6 is a flow diagram illustrating a process for transmitting data packets to the MS based on a scheduling scheme according to an exemplary embodiment of the present invention.

FIG. 6 is a flow diagram illustrating a process for transmitting data packets to the MS based on a scheduling scheme according to an exemplary embodiment of the present invention.

Referring to FIG. 6, in step 601, the BS stores a data packet to be transmitted to the MS in a queue of the BS. Then, in step 603, the BS calculates t, that is, the time taken before the data packet stored in its queue is transmitted to the MS. Then, in step 605, the BS determines if t exceeds the maximum time allowed for the delay of the data packet, that is, a difference between $T_d$ and a margin ($\alpha$) applied to $T_d$. As a result of the comparison in step 605, when t exceeds the difference between $T_d$ and $\alpha$, the BS proceeds to step 607. In step 607, the BS transmits a maximum number of data packets that can be transmitted by using the resources allocated to a corresponding connection.

Meanwhile, as a result of the comparison in step 605, when t does not exceed the difference between $T_d$ and $\alpha$, the BS proceeds to step 601.

Hereinafter, a detailed description will be given on an uplink power control scheme for minimizing power consumption of an MS having received data packets transmitted based on a scheduling scheme according to an exemplary embodiment of the present invention. When the MS transmits a preset number of data packets to the BS, the larger a ratio of a transmission capacity to a transmission power is, the more the MS can reduce the power consumption. The ratio $C_p$ of a transmission capacity to a transmission power can be defined by formula (3) below, using Shannon's channel capacity law.

$$C_p = \frac{C}{P} = \frac{\log\left(1 + \alpha \times \frac{P}{N}\right)}{P} \tag{3}$$

In formula (3), C denotes a data packet transmission capacity, P denotes a magnitude of transmission power, α denotes a channel gain, and N denotes a noise level. Meanwhile, formula (3) can be expressed by a graph illustrated in FIG. 7.

Figure 7:
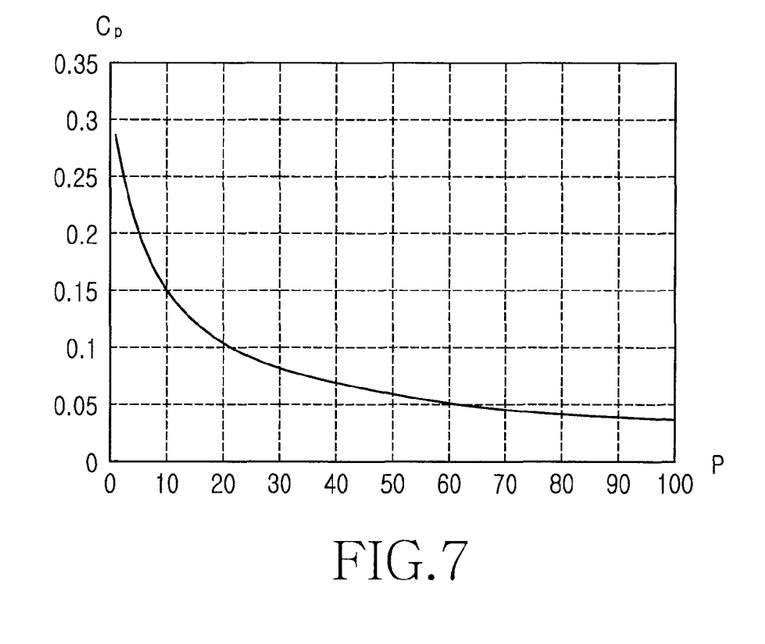
FIG. 7 is a graph illustrating a transmission capacity with respect to a transmission power of data packets in accordance with the Shannon's channel capacity law.

FIG. 7 is a graph illustrating a transmission capacity with respect to a transmission power of data packets in accordance with the Shannon's channel capacity law.

In the graph of FIG. 7, the x-axis represents P and the y-axis represents $C_p$. As noted from the graph, the smaller P is, the larger $C_p$ is.

Meanwhile, energy E necessary for the transmission of a data packet having a preset size, e.g. a size of B, can be defined by formula (4) below.

$$E = Pt = P \times \left(\frac{B}{C}\right) \rightarrow (t = B/C) = \left(\frac{P}{C}\right) \times B = \frac{B}{C_p} \propto P \tag{4}$$

As noted from formula (4), E is proportional to P, so the smaller P is, the smaller E is. Therefore, when the MS transmits a data packet to the BS, it is possible to minimize power consumption by lowering P as much as possible.

Meanwhile, in a communication system using an Adaptive Modulation and Coding (AMC) scheme, lowering of the transmission power has an effect on the transmission rate and transmission delay of data packets. In other words, when transmission power is lowered during the transmission of data packets, the system uses a stronger Modulation and Coding Scheme (MCS) having a lower transmission rate in order to maintain a Packet Error Rate (PER) below a preset reference. As a result, the average transmission rate is lowered and the maximum number of data packets transmissible in one frame is reduced. Therefore, transmission delay time for the transmission of a packet having a preset size increases.

When the data packet transmission rate decreases or the data packet transmission delay increases as described above, it may be impossible to guarantee a preset Quality of Service (QoS) for the MS. Therefore, this matter should be taken into account when lowering the transmission power. That is, in order to minimize power consumption of the MS during transmission of data packets from the MS to the BS, it is possible to lower the transmission power as much as possible. However, it is necessary to maintain a minimum transmission power capable of sufficiently guaranteeing the QoS of a corresponding service in spite of the data packet transmission rate and the data packet transmission delay.

A power control scheme for lowering the transmission power as much as possible within a limit of a minimum transmission power capable of sufficiently guaranteeing the QoS of a corresponding service can be defined by formula (5) below.

$$T_{est} > T_{req}$$

$$D_{est} < D_{req} \tag{5}$$

In equation (5), $T_{est}$ denotes a data packet transmission rate estimated according to an exemplary embodiment of the present invention, $T_{req}$ denotes a minimum transmission rate allowed in the system in order to guarantee the QoS of a corresponding connection, $D_{est}$ denotes data packet delay time estimated according to an exemplary embodiment of the present invention, and $D_{req}$ denotes maximum delay time allowed in the system in order to guarantee the QoS of a corresponding connection.

When formula (5) is satisfied, that is, when $T_{est}$ exceeds $T_{req}$ and $D_{est}$ is smaller than $D_{req}$, the BS transmits a command requiring a 1 dB reduction of the uplink transmission power to the MS and the MS lowers the transmission power according to the command. Meanwhile, when $T_{est}$ does not exceed $T_{req}$ and $D_{est}$ is larger than or equal to $D_{req}$, the BS transmits a command requiring the 1 dB raise of the uplink transmission power to the MS and the MS raises the transmission power according to the command.

$T_{est}$ and $D_{est}$ can be defined by formula (6) below.

$$T_{est} = RB_I/T_f$$

$$D_{est} = E[P(t)]T_f/(RB_I) \tag{6}$$

In formula (6), R denotes an average quantity of resources assignable to an MS in one frame, I denotes an MCS level for the MS that is determined based on a CINR capable of measuring the signal quality of pilot channel signals transmitted from the BS to the MS, $B_I$ denotes the number of bits transmissible through one radio resource by using I, $T_f$ denotes a frame length, P(t) denotes a size of a packet received at the $t^{th}$ frame, and E[P(t)] denotes an estimated average size of data packets having been received up to the current time, which is necessary because it is difficult to know an exact size of a data packet currently transmitted by the BS.

That is, it is possible to control uplink transmission power of an MS by estimating $T_{est}$ and $D_{est}$ as in formula (6) and comparing $D_{est}$ and $D_{req}$, $T_{est}$ and $T_{req}$ as in formula (5). Next, a process of controlling a transmission power of an MS depending on a power control method according to an exemplary embodiment of the present invention by a BS having detected a low battery state of the MS will be described with reference to FIG. 8.

Figure 8:
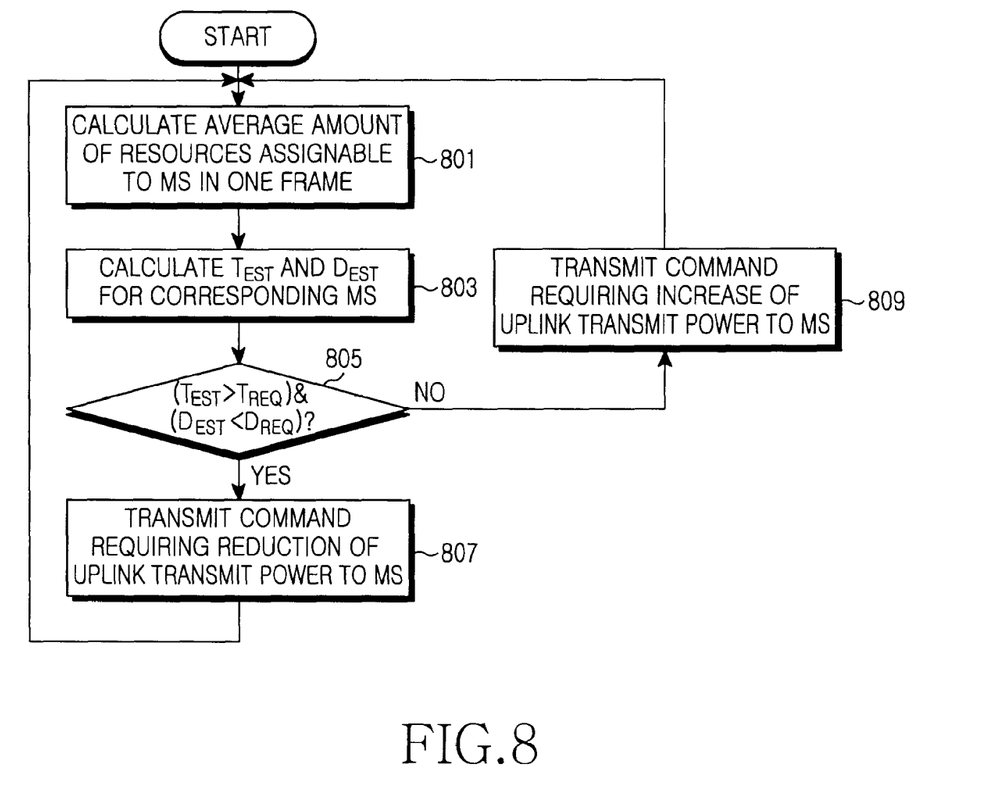
FIG. 8 is a flow diagram illustrating a process of controlling a transmission power of an MS depending on a power control method according to an exemplary embodiment of the present invention.

FIG. 8 is a flow diagram illustrating a process of controlling a transmission power of an MS depending on a power control method according to an exemplary embodiment of the present invention.

Referring to FIG. 8, in step 801, the BS calculates an average amount R of resources assignable to the MS in one frame, for example, an amount of resources allocated as a result of scheduling based on a channel state of the MS or a priority of a connection. Then, in step 803, the BS calculates a data packet transmission rate (i.e. $T_{est}$) estimated for a corresponding MS according to an exemplary embodiment of the present invention and data packet delay time (i.e. $D_{est}$) estimated based on time taken for transmission of a data packet at $T_{est}$. Then, in step 805, the BS determines if $T_{est}$ exceeds a minimum transmission rate (i.e. $T_{req}$) allowed in the system in order to guarantee the QoS of corresponding connection and determines if $D_{est}$ is smaller than the maximum delay time (i.e. $D_{req}$) allowed in the system in order to guarantee the QoS of the corresponding connection. As a result of the determination in step 805, when $T_{est}$ exceeds $T_{req}$ and $D_{est}$ is smaller than $D_{req}$, the BS proceeds to step 807. In step 807, the BS transmits a command requiring a reduction of the uplink transmission power to the MS.

As a result of the determination in step 805, when $T_{est}$ does not exceed $T_{req}$ or $D_{est}$ is not smaller than $D_{req}$, the BS proceeds to step 809. In step 809, the BS transmits a command requiring a raise of the uplink transmission power to the MS.

As described above, exemplary embodiments of the present invention propose a low battery state for a mobile station having insufficient remaining battery power in a communication system. According to exemplary embodiments of the present invention, as described above, a base station and a mobile station in a low battery state can use a downlink scheduling and uplink power control method of exemplary embodiments of the invention, thereby minimizing power consumption.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting data based on an operational state of a mobile station by a base station in a communication system, the method comprising:
   when detecting a low battery state of the mobile station, storing one or more data packets to be transmitted to the mobile station;
   extracting at least one data packet among the data packets based on a maximum allowable delay time of the data packet and a transmission delay time delayed before the stored data packet is transmitted to the mobile station;
   transmitting at least a part of the extracted at least one data packet to the mobile station by using a resource allocated to the mobile station; and
   controlling a transmission power of the mobile station based on an estimated data packet transmission rate and estimated data packet delay time, when the base station detects a low battery state of the mobile station,
   wherein the controlling of the transmission power comprises transmitting a command for lowering the transmission power of the mobile station when the estimated data packet transmission rate exceeds a minimum transmission rate for the communication system in order to guarantee a service quality of a corresponding connection and when the estimated data packet delay time is less than a maximum delay time for the communication system in order to guarantee the service quality of the corresponding connection.

2. The method of claim 1, wherein the transmitting of the at least a part of the extracted at least one data packet comprises:
   calculating a maximum number of data packets transmissible by using the resource allocated to the mobile station; and
   transmitting the calculated number of data packets to the mobile station.

3. The method of claim 1, wherein the transmitting of the at least a part of the extracted at least one data packet comprises sequentially selecting transmissible data packets in accordance with a sequence in which the extracted data packets have been generated.

4. The method of claim 1, wherein the controlling of the transmission power comprises transmitting a command for raising the transmission power of the mobile station when the estimated data packet transmission rate is less than or equal to a minimum transmission rate allowed in the communication system in order to guarantee a service quality of a corresponding connection or when the estimated data packet delay time is longer than or equal to a maximum delay time for the communication system in order to guarantee the service quality of the corresponding connection.

5. The method of claim 1, wherein the estimated data packet transmission rate and the estimated data packet delay time are calculated based on an average amount of resources assignable to the mobile station in one frame.

6. The method of claim 1, wherein the base station detects the low battery state when the base station receives an indication message indicating that the capacity of the battery of the mobile station is low.

7. A method for transmitting data based on an operational state of a mobile station in a communication system, the method comprising:
   transiting to a low battery state from at least one of a dormant state in which the mobile station is connected to a base station but does not transmit or receive a data packet and an idle state in which the mobile station has been registered in the base station but is not yet connected to the base station, when a remaining battery capacity of the mobile station is less than or equal to a preset battery capacity;
   receiving a command from the base station for controlling the transmission power,
   setting a minimum transmission power in order to maintain a transmission power capable of guaranteeing a service quality of a corresponding connection based on the low battery state; and
   transmitting the data packet with the set transmission power, the transmitting of the data packet further comprising:
   wherein the command is based on an estimated data packet transmission rate and an estimated data packet delay time, and
   wherein the command is for lowering the transmission power of the mobile station, when the estimated data packet transmission rate exceeds a minimum transmission rate allowed in the communication system in order to guarantee a service quality of a corresponding connection and the estimated data packet delay time is less than a maximum delay time allowed in the communication system in order to guarantee the service quality of the corresponding connection.

8. The method of claim 7, wherein the command is for raising the transmission power of the mobile station is received, when the estimated data packet transmission rate is less than or equal to a minimum transmission rate allowed in the communication system in order to guarantee a service quality of corresponding connection or when the estimated data packet delay time is longer than or equal to a maximum delay time allowed in the communication system in order to guarantee the service quality of the corresponding connection,
   wherein the transmission power corresponding to the command is set.

9. The method of claim 7, wherein the estimated data packet transmission rate and the estimated data packet delay time are calculated based on an average amount of resources assignable to the mobile station in one frame.

10. The method of claim 7, wherein the transiting to the low battery state comprises:
    transmitting an indication message indicating that the capacity of the battery is low to the base station; and
    transiting to the low battery state when the mobile station receives a response message to the indication message from the base station.

11. A system for transmitting data based on an operational state of a mobile station in a communication system, the system comprising:

a base station for, when detecting a low battery state of the mobile station, storing one or more data packets to be transmitted to the mobile station, extracting at least one data packet among the data packets based on a maximum allowable delay time of the data packet and a transmission delay time delayed before the stored data packet is transmitted to the mobile station, and transmitting at least a part of the extracted at least one data packet to the mobile station by using a resource allocated to the mobile station, wherein when the base station detects a low battery state of the mobile station, the base station controls transmission power of the mobile station based on an estimated data packet transmission rate and estimated data packet delay time, and wherein the base station transmits a command for lowering the transmission power of the mobile station when the estimated data packet transmission rate exceeds a minimum transmission rate for the communication system in order to guarantee a service quality of a corresponding connection and the estimated data packet delay time is less than a maximum delay time for the communication system in order to guarantee the service quality of the corresponding connection.

12. The system of claim 11, wherein the base station calculates a maximum number of data packets transmissible by using the resource allocated to the mobile station, and transmits the calculated number of data packets to the mobile station.

13. The system of claim 11, wherein the base station sequentially selects transmissible data packets in accordance with a sequence in which the extracted data packets have been generated.

14. The system of claim 11, wherein the base station transmits a command for raising the transmission power of the mobile station when the estimated data packet transmission rate is less than or equal to a minimum transmission rate for the communication system in order to guarantee a service quality of a corresponding connection or when the estimated data packet delay time is longer than or equal to a maximum delay time for the communication system in order to guarantee the service quality of the corresponding connection.

15. The system of claim 11, wherein the estimated data packet transmission rate and the estimated data packet delay time are calculated based on an average amount of resources assignable to the mobile station in one frame.

16. The system of claim 11, wherein the base station detects the low battery state when the base station receives an indication message indicating that the capacity of the battery of the mobile station is low.

17. A system for transmitting data based on an operational state of a mobile station in a communication system, the system comprising:

a mobile station for transiting to a low battery state from at least one of a dormant state in which the mobile station is connected to a base station but does not transmit or receive a data packet and an idle state in which the mobile station has been registered in the base station but is not yet connected to the base station, when a remaining battery capacity of the mobile station is less than or equal to a preset battery capacity, and for setting a minimum transmission power in order to maintain a transmission power capable of guaranteeing a service quality of a corresponding connection based on the low battery state, for transmitting the data packet with the set transmission power, wherein the mobile station receives a command for controlling the transmission power based on an estimated data packet transmission rate and estimated data packet delay time from the base station, and wherein the command is for lowering the transmission power of the mobile station, when the estimated data packet transmission rate exceeds a minimum transmission rate allowed in the communication system in order to guarantee a service quality of a corresponding connection and the estimated data packet delay time is less than a maximum delay time allowed in the communication system in order to guarantee the service quality of the corresponding connection.

18. The system of claim 17, wherein the mobile station transmits an indication message indicating that the capacity of the battery is low to the base station, and transits to the low battery state when the mobile station receives a response message to the indication message from the base station.

* * * * *